(12) United States Patent
Ogura

(10) Patent No.: US 7,542,158 B2
(45) Date of Patent: Jun. 2, 2009

(54) IMAGE FORMING APPARATUS

(75) Inventor: Masaaki Ogura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 947 days.

(21) Appl. No.: 10/419,192

(22) Filed: Apr. 21, 2003

(65) Prior Publication Data

US 2004/0001222 A1  Jan. 1, 2004

(30) Foreign Application Priority Data

Apr. 22, 2002 (JP) ............... 2002-118849
Apr. 14, 2003 (JP) ............... 2003-109350

(51) Int. Cl.
*G06F 3/12* (2006.01)
(52) U.S. Cl. .............. 358/1.15; 358/400; 358/1.16; 358/1.18; 358/406; 358/426.02; 709/220; 709/224
(58) Field of Classification Search ........... 358/1.15, 358/1.16, 400, 406, 426.02, 1.18; 709/220, 709/224

See application file for complete search history.

(56) References Cited

U.S. PATENT DOCUMENTS

| 5,512,979 | A | 4/1996 | Ogura |
| 5,727,248 | A | 3/1998 | Ogura |
| 5,893,005 | A | 4/1999 | Ogura |
| 6,219,151 | B1 | 4/2001 | Manglapus et al. |
| 6,985,944 | B2 * | 1/2006 | Aggarwal ............ 709/224 |
| 7,031,014 | B2 * | 4/2006 | Ohwa ............... 358/1.18 |
| 7,076,543 | B1 * | 7/2006 | Kirti et al. .......... 709/223 |
| 7,082,460 | B2 * | 7/2006 | Hansen et al. ........ 709/220 |
| 2001/0017700 | A1 | 8/2001 | Homma |
| 2002/0010854 | A1 | 1/2002 | Ogura |
| 2002/0080390 | A1 | 6/2002 | Ogura |
| 2002/0156947 | A1 * | 10/2002 | Nishio ............... 710/36 |
| 2006/0126115 | A1 | 6/2006 | Morikawa et al. |
| 2007/0283019 | A1 | 12/2007 | Funahashi |

FOREIGN PATENT DOCUMENTS

| EP | 0 991 227 A2 | 4/2000 |
| EP | 1 184 733 A2 | 3/2002 |
| JP | 11-203087 | 7/1999 |
| JP | 2000-284935 | 10/2000 |

* cited by examiner

*Primary Examiner*—Twyler L. Haskins
*Assistant Examiner*—Michael Burleson
(74) *Attorney, Agent, or Firm*—Dickstein Shapiro LLP

(57) ABSTRACT

An image forming apparatus manages a plurality of external apparatuses while collecting information regarding each external apparatus through a network using a communication condition acquired through the network. A managed object specifying part specifies managed object apparatuses that are managed by the image forming apparatus through a communication part. An apparatus correspondence communication condition acquiring part receives via the communication part information regarding communication condition corresponding to the managed object apparatuses specified by the managed object specifying part, and stores in a memory part the received information by relating to identification information of the managed object apparatuses. An apparatus monitoring part refers to the communication conditions stored in the memory part on an individual managed object apparatus basis so as to acquire state information via the communication part, and stores the acquired state information in the memory part. An information providing part provides to external apparatuses through the communication part the state information of each managed object apparatus stored in the memory part.

18 Claims, 11 Drawing Sheets

FIG.3

APPARATUS INFORMATION

| No. | MODEL/ NUMBER | IP ADDRESS | MAC ADDRESS | MANUFACTURER NAME | ABNORMAL COMMUNICATION TIME | NORMAL COMMUNICATION TIME | REPORT DAY | REMARKS |
|---|---|---|---|---|---|---|---|---|
| 1 | 1234-123456 | 133.139.123.123 | 00-60-1D-F2-E2-5F | A COMPANY | 2001/12/17;10:20 | 2001/12/17;15:20 | 5 | |
| 2 | 2345-123456 | 133.139.123.456 | 00-60-1D-F2-E2-60 | B COMPANY | 2001/12/17;10:20 | 2001/12/17;15:20 | 5 | |
| 3 | 1234-789456 | 133.139.123.789 | 00-60-1D-F2-E2-61 | A COMPANY | 2001/12/17;10:20 | 2001/12/17;15:20 | 10 | |
| 4 | 1234-741852 | 133.139.123.124 | 00-60-1D-F2-E2-50 | A COMPANY | 2001/12/17;10:20 | 2001/12/17;15:20 | 10 | |
| 5 | 1234-258963 | 133.139.123.156 | 00-60-1D-F2-E2-51 | C COMPANY | 2001/12/17;10:20 | 2001/12/17;15:20 | 5 | |
| 6 | 2589-123456 | 133.139.123.157 | 00-60-1D-F2-E2-52 | A COMPANY | 2001/12/17;10:20 | 2001/12/17;15:20 | 5 | |
| 7 | 3698-123456 | 133.139.123.159 | 00-60-1D-F2-E2-53 | A COMPANY | 2001/12/17;10:20 | 2001/12/17;15:20 | 5 | |
| 8 | 3698-223456 | 133.139.123.160 | 00-60-1D-F2-E2-54 | A COMPANY | 2001/12/17;10:20 | 2001/12/17;15:20 | 20 | |
| 9 | 9632-123456 | 133.139.123.162 | 00-60-1D-F2-E2-55 | D COMPANY | 2001/12/17;10:20 | 2001/12/17;15:20 | 20 | |
| 10 | 2587-123956 | 133.139.123.170 | 00-60-1D-F2-E2-56 | D COMPANY | 2001/12/17;10:20 | 2001/12/17;15:20 | 20 | |

FIG.4

CENTER INFORMATION

| No. | ITEM | SET VALUE | | | |
|---|---|---|---|---|---|
| 1 | SELECTION OF CONNECTION METHOD | TEL/INTERNET/INT. MEMORY (SET ONE) | | | |
| 2 | DIAL DESIGNATION | TEL No. (03-1234-5678) | OUTSIDE CALL No. (O) | LINE (DP) | NUMBER OF CALLING (10) | NUMBER OF RECALLING (3) |
| 3 | INTERNET DESIGNATION | IP ADDRESS | URL | PROXY SERVER ADDRESS | PROXY-ID | PROXY-PASSWORD |
| 4 | COUNTER REPORT | 12:30 | | | |
| 5 | ALARM REPORT | 19:00 | | | |

FIG.5

COMMUNICATION CONDITION WITH MANAGING APPARAUTS

| MODEL INFO. | ITEM | FORMAT | PROTOCOL | REMARKS |
|---|---|---|---|---|
| 1234 | COUNTER VALUE | MIB | SNMP | |
| | SC INFO. | XML | HTTP | |
| | ALARM INFO. | XML | HTTP | |
| | FIRM WARE | FILE | HTTP | |
| 2345 | COUNTER VALUE | XML | SOAP | |
| | SC INFO. | XML | SOAP | |
| | ALARM INFO. | XML | SOAP | |
| | FIRM WARE | FILE | HTTP | |
| 9623 | COUNTER VALUE | MIB | SNMP | |
| | SC INFO. | MIB | SNMP | |
| | ALARM INFO. | MIB | SNMP | |
| | FIRM WARE | NON | NON | NON INDICATES NOT SUPPORT |

FIG.10

MENU

1. ATTEST
2. SERVER SET
3. CONDITION MONITOR
4. APPARATUS SET
5. TECH. INFO
6. REPORT
7. TECH. SUPPORT

APPARATUS CONDITION MONITOR

1. ABNORMAL APPARATUS LIST

| No. | LOCATION | MODEL/NUMBER | DAY/TIME | PHENOM. | TEL/NAME |
|---|---|---|---|---|---|
| 1 | BUILD No.1, 2F GENERAL AFFAIR | 1234-123456 | 01/12/25 09:20 | SC123 | 1234-YM |
| 2 | BUILD No.2 DESIGN SEC. 1 | 4567-963258 | 01/12/25 10:20 | SC258 | 1477-OT |
| 3 | BUILD No.3 DESIGN SEC. 2 | 1474-258963 | 01/12/25 12:20 | SC123 | 4785-YM |
| 4 | BUILD No.5 QA | 1234-987654 | 01/12/25 12:40 | FIX JAM | 8527-KM |
| 5 | BUILD No.6 PLANNING | 1234-852147 | 01/12/25 15:20 | DOOR OPEN | 1455-SK |

2. DETAILE

MODEL/NUMBER  1234-123456
TATAL  12345 SHEETS
FIX TEMP.  179°C
TONER CON.  1.23
SC123 EVENTS  123
SC123 HISTORY  01/11/10
  01/11/20
  01/11/30

FIG.11A (a)

APPARATUS INFO. 1

| No. | MODEL/NUMBER | IP ADDRESS | MAC ADDRESS | MANUFACTURER NAME |
|---|---|---|---|---|
| 1 | 1234-123456 | 133.139.123.123 | 0060-1D-F2-E2-5F | A COMNAPY |

ABNORMAL LOG 1

| 1 | DAY/TIME | ABNORMAL INFO. | REMARKS |
|---|---|---|---|
| 3 | 2001/12/10 9:20 | SC123 | |
| 4 | 2001/11/10 9:20 | SC123 | |
| 5 | 2001/10/10 18:20 | SC500 | |
| 6 | 2001/10/10 9:20 | SC500 | |
| 7 | 2001/09/10 9:20 | SC500 | |
| 8 | 2001/08/10 9:20 | JAM 200 | |
| 9 | | | |
| 10 | | | |

FIG.11B (b)

APPARATUS INFO. 2

| No. | MODEL/NUMBER | IP ADDRESS | MAC ADDRESS | MANUFACTURER NAME |
|---|---|---|---|---|
| 1 | 2345-123456 | 133.139.123.456 | 0060-1D-F2-E2-60 | B COMPANY |

ABNORMAL LOG 1

| 1 | DAY/TIME | ABNORMAL INFO. | REMARKS |
|---|---|---|---|
| 3 | 2001/12/10 10:20 | SC123 | |
| 4 | 2001/11/10 11:20 | JAM 200 | |
| 5 | | | |
| 6 | | | |
| 7 | | | |
| 8 | | | |
| 9 | | | |
| 10 | | | |

IMAGE FORMING APPARATUS

BACKGROUND OF THE INVENTION

1. Field of the Invention

The present invention generally relates to image forming apparatuses and, more particularly, to an image forming apparatus such as a copy machine provided with a function to manage external apparatuses.

2. Description of the Related Art

Recently, a so-called complex copy machine, which is provided with a facsimile function, has prevailed in image forming apparatuses such as a copy machine. A facsimile-function-added copy machine is naturally provided with a communication circuit connected to an external line. If an image forming apparatus is provided with a function to manage a plurality of external apparatuses, it is convenient since the state of the external apparatuses can be unitarily managed through communication between the image forming apparatus and a central station.

However, since a protocol for transmission and reception of information may be different among external apparatuses to be managed, the image forming apparatus, which manages the external apparatuses, must be provided with a function to correspond to a plurality of protocols or communication conditions of the external apparatuses to be managed.

However, in order to switch a protocol for each external apparatus, a plurality of protocols corresponding to all of the external apparatuses must be provided in one image forming apparatus, which manages the external apparatuses so as to switch to one of the protocols corresponding to one of the external apparatuses to communicate with. Such a function requires a complex structure of a communication means. Additionally, such a function requires a large memory capacity, which is inconvenient for an image forming apparatus having a limited memory capacity.

Moreover, when making an image forming apparatus manage a plurality of external apparatuses, it is necessary to have the image forming apparatus store beforehand information regarding the managed object apparatuses, which are to be managed by the image forming apparatus. Thus, it is necessary to give a consideration so that a setup for such a storing procedure can be easily performed.

Additionally, it is necessary to consider how to check the status information of each of the external apparatuses, which are to be managed by the image forming apparatus. Further, when reviewing the state information through an external apparatus or setting a function to an external apparatus, communication must be performed with the image forming apparatus as a managing apparatus, and, therefore, the image forming apparatus must change a communication condition or a protocol each time communicating with a different external apparatus.

SUMMARY OF THE INVENTION

It is a general object of the present invention to provide an improved and useful image forming apparatus in which the above-mentioned problems are eliminated.

A more specific object of the present invention is to provide an image forming apparatus which can manage a plurality of external apparatuses connected through a network while collecting information regarding each external apparatus through the network using a communication condition acquired through the network.

In order to achieve the above-mentioned objects, there is provided according to the present invention an image forming apparatus comprising: image forming means; input means which directs operations to the image forming means; display means which performs a display according to operations of the input means; memory means which stores image data required for the operation of the image forming means; communication means which communicates with external apparatuses; and control means which controls operations of the aforementioned means, wherein the image forming apparatus further comprises; managed object specifying means which specifies managed object apparatuses that are managed by the image forming apparatus through the communication means; apparatus correspondence communication condition acquiring means which receives via the communication means information regarding communication condition corresponding to the managed object apparatuses which the managed object specifying means specified, and stores in the memory means the received information regarding communication condition by relating to identification information of the managed object apparatuses; apparatus monitoring means which refers to the communication conditions stored in the memory means on an individual managed object apparatus basis so as to acquire state information via the communication means on individual managed object apparatus basis, and stores the acquired state information in the memory means; and information providing means which provides to external apparatuses through the communication means the state information of each managed object apparatus stored in the memory means.

According to the present invention, the image forming apparatus can manage a plurality of external apparatuses connected through the network while collecting information regarding each external apparatus through the network using a communication condition acquired through the network.

In the image forming apparatus according to the present invention, the managed object specifying means may comprise a managed object limiting part which selects the managed object apparatuses from among apparatuses communicable through the communication means. Additionally, the managed object specifying means may select the managed object apparatuses prior to acquire discrimination information from the external apparatuses communicable through the communication means.

The image forming apparatus according to the present invention may further comprise scanner means which scans character images on a medium and character recognition means which converts the character image read by the scanner means into character data, wherein the managed object limiting part acquires data of the discrimination information, which corresponds to apparatuses to be set as the managed object apparatuses, recorded on the medium by the scanner means and the character recognition means, and stores the data of the discrimination information in the memory means as information for specifying the managed object apparatuses.

The managed object limiting part may have an external file acquiring function to acquire an external file in which the discrimination information of apparatuses to be set as the managed object apparatuses is stored, and the managed object limiting part reads the data of the discrimination information from the external file and stores the data of the discrimination information in the memory means as information for specifying the managed object apparatuses.

The managed object limiting part may select apparatuses to be set as the managed object apparatuses after acquiring the discrimination information from the apparatuses communicable through the communication part. Alternatively, the managed object limiting apparatus may select the apparatuses to be set as the managed object apparatuses in accordance with managed object apparatus individually selecting operation applied from the input means after acquiring the discrimination information from the apparatuses communicable through the communication part, and stores the data of the discrimination information in the memory means as information for specifying the managed object apparatuses.

The managed object limiting apparatus may cause the display means to display the discrimination information of the apparatuses communicable through the communication part after acquiring the discrimination information from the apparatuses communicable through the communication part, and, thereafter, selects the apparatuses to be set as the managed object apparatuses in accordance with managed object apparatus individually selecting operation applied from the input means and stores the data of the discrimination information in the memory means as information for specifying the managed object apparatuses.

The managed object limiting part may acquire the discrimination information from the apparatuses communicable through the communication part and stores the acquired discrimination information in the memory means, the managed object limiting part generating a list of kinds of elements contained in the acquired discrimination information on an individual item basis and displaying the list on the display means, and upon receipt of selection from the input means of kinds in the list displayed on the display part, the managed object limiting part stores the discrimination information containing the selected kinds in the memory means as the apparatus to be set as the managed object apparatuses.

The managed object limiting part may display the discrimination information containing the elected kinds on the display means before storing the discrimination information in the memory means as the discrimination information of the apparatus to be set as the managed object apparatuses, and receives from the input means a confirmation input as to whether or not the apparatuses corresponding to the displayed discrimination information are appropriate for the managed object apparatuses.

Additionally, the discrimination information of the apparatuses may include information regarding manufacture's names of the apparatuses. The discrimination information of the apparatuses may include information regarding models of the apparatuses.

The managed object limiting part may use Simple Network Management Protocol (SNMP) when acquiring the discrimination information from the apparatuses; and the discrimination information is constituted by items of Management Information Base (MIB).

The managed object limiting part may use Simple Network Management Protocol (SNMP) when acquiring the discrimination information from the apparatuses, and the discrimination information is constituted by items of Management Information Base (MIB).

The image forming apparatus according to the present invention may further comprise remote start means for starting an operation of the managed object specifying means when receiving a start command of the managed object specifying means from the external apparatuses through the communication means.

In the image forming apparatuses according to the present invention, a request to a canter apparatus which manages the image forming apparatus and reception from the center apparatus may be performed according to Simple Object Access Protocol (SOAP).

Other objects, features and advantages of the present invention will become more apparent from the following detailed description when read in conjunction with the accompanying drawings.

BRIEF DESCRIPTION OF THE DRAWINGS

FIG. 3 is an illustration showing an example of discrimination information of managed object apparatuses and an example of state information;

FIG. 4 is an illustration showing apparatus information required for connecting the image forming apparatus to a center apparatus;

FIG. 5 is an illustration showing an example of information representing communication conditions of each apparatus;

FIG. 10 is an illustration of an example of a screen for reviewing the state information by the portable terminal or the customer terminal; and FIGS. 11A and 11B are illustrations showing examples of a procedure for reviewing the state information.

DETAILED DESCRIPTION OF THE PREFERRED EMBODIMENTS

A description will now be given, with reference to FIG. 1, of an embodiment of the present invention.

Figure 1:
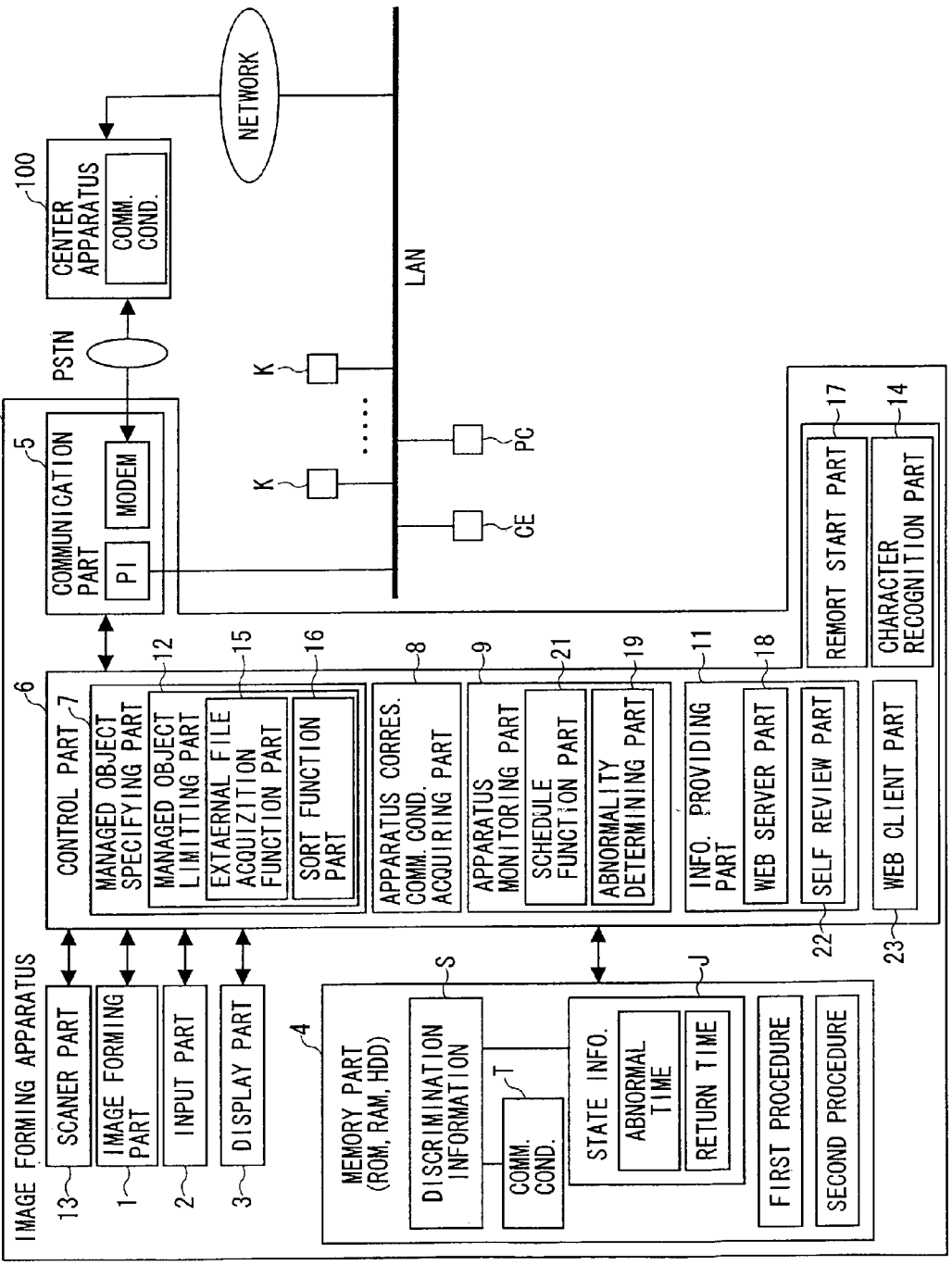
FIG. 1 is a block diagram of an image forming apparatus according to an embodiment of the present invention.

FIG. 1 is a block diagram of an image forming apparatus C according to the embodiment of the present invention. The image forming apparatus C shown in FIG. 1 is connected to external apparatuses K, CE and PC via a local area network (LAN), and has a function as a managing apparatus which manages the external apparatuses. The LAN is connected to a further large network such as the Internet. Additionally, the image forming apparatus C is also connected to a center apparatus 100 via the network to which the LAN is connected. Here, K indicates a managed object apparatus which is an object to-be managed by the image forming apparatus C; CE indicates a portable terminal which is connectable to the LAN; and PC indicates a computer which is located at a user's site and connectable to the LAN.

The image forming apparatus C shown in FIG. 1 comprises an image forming part 1, an input part 2 which directs operations to the image forming part 1, a display part 3 which performs a display according to operations of the input part 2, a memory part 4 which stores image data required for the operation of the image forming part 1, a communication part 5 which communicates with a plurality of external apparatuses, and a control part 6 which controls the operation of each of the above-mentioned parts.

The control part 6 of the image forming apparatus C further comprises a managed object specifying part 7, an apparatus correspondence communication condition acquiring part 8, an apparatus monitoring part 9, and an information providing part 11. The managed object specifying part 7 specifies managed object apparatuses K, which are managed by the image forming apparatus C, through the communication part 5. The apparatus correspondence communication condition acquiring part 8 stores in the memory part 4 the information regarding communication condition T, which corresponds to the managed object apparatuses K specified by the managed object specifying part 7, by relating the information to identification information S of the managed object apparatuses K. The apparatus monitoring part 9 acquires state information J of each of the managed object apparatuses K through the communication part 5 by referring to the communication condition T stored in the memory part 4, and stores the acquired state information J in the memory part 4 on an individual managed object apparatus basis. The information providing part 11 provides to external apparatuses through the communication part 5 the state information J of each managed object apparatus K stored in the memory part 4.

Figure 2:
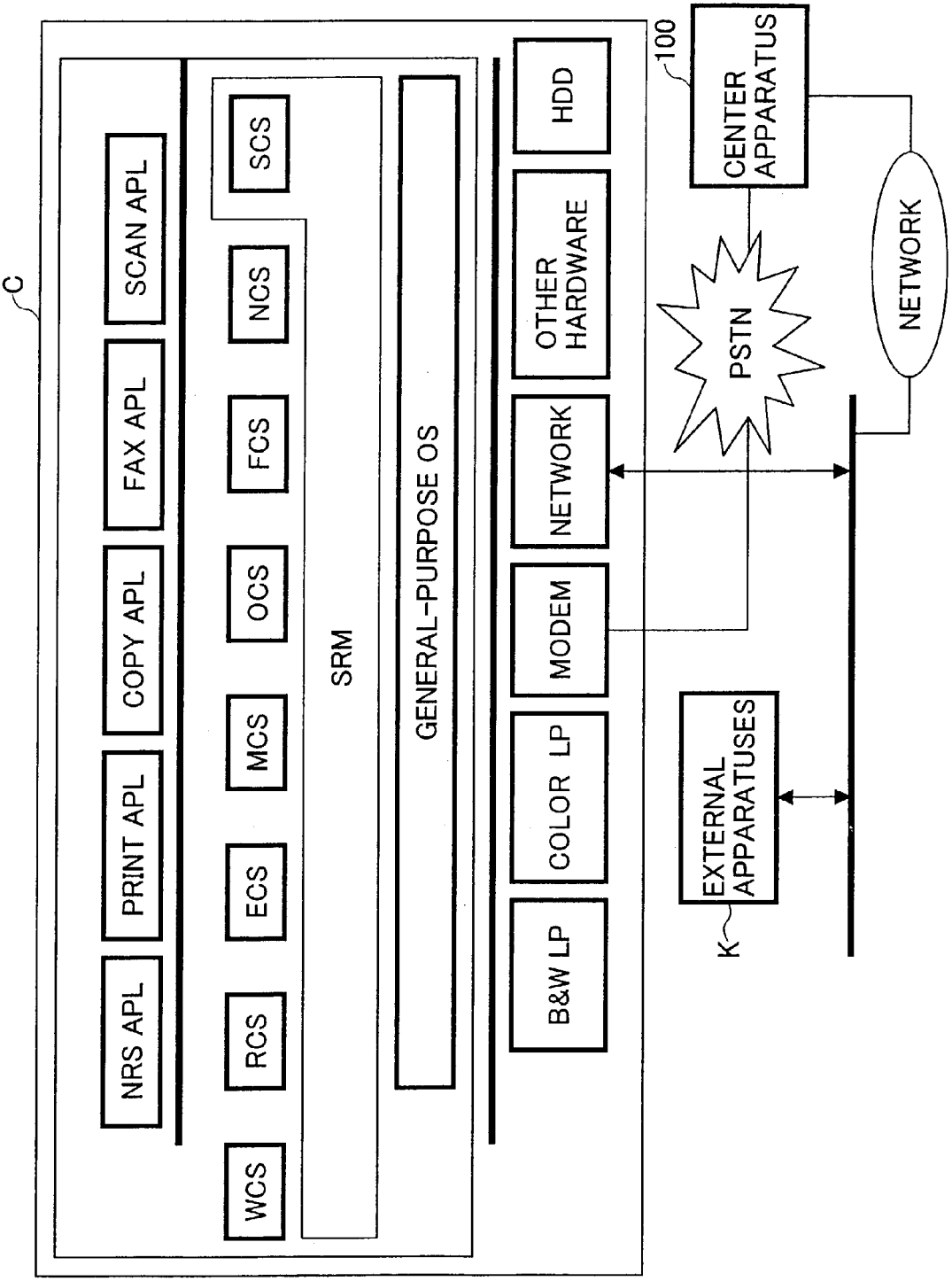
FIG. 2 is an illustration of a structure of software, which the control part shown in FIG. 1 performs.

FIG. 2 is an illustration of a structure of software, which the control part 6 performs. In the software performed by the control part 6, a plurality of functional processes are concurrently performed based on a multi-task general operating system (OS) such as UNIX®. In FIG. 2, various application processes (NRS, PRINT, COPY, FAX, SCAN), which the control part 6 performs, are indicated in the uppermost layer. A plurality of service processes (WSC, RCS, ECS, MCS, OCS, FCS, NCS) are provided between the application process and the general OS. The lowermost layer in FIG. 2 indicates a hardware structure.

NCS (Network Control Service) functions as the communication part 5 among the above-mentioned service processes. Additionally, MCS (Memory Control Service) manages read and write operations of the memory part 4. Moreover, WCS (Web Control Service) realizes a Web server part 18 and a Web client part 23. Operations of other parts of the control part 6 are realized by NRS_APL (NRS_Application) of the application process, and RCS (Remote Control Service) of the service process.

The managed object specifying part 7 of the image forming apparatus C according to the present embodiment is provided with a managed object limiting part 12, which determines or select apparatuses to be set as the managed object apparatuses K from among apparatuses that are communicable through the communication part 5.

The managed object limiting part 12 is provided with a function, as one of functions to be achieved by the managed object limiting part 12, to discriminate apparatuses, which are set as the managed object apparatuses K, prior to acquire discrimination information of the apparatuses which are communicable through the communication part 5, from the apparatuses concerned.

In the present embodiment, in addition to the image forming part 1, a scanner part 13 which reads a character image on a medium and a character recognition part 14 which converts the character image read by the scanner part 13 into character data are provided so as to realize the function to select apparatuses to be set as the managed object apparatuses K. The managed object limiting part 12 acquires the discrimination information S of the apparatuses that are set as the managed object apparatuses K through the scanner part 13 and the character recognition part (optical character reader: OCR) 14. The discrimination information S is printed on a medium and read by the canner part 13 and converted into data by the character recognition part 14. The managed object limiting part 12 stores the discrimination information S in the memory part 4 as data for specifying the managed object apparatuses K.

Moreover, the managed object limiting part 12 is provided with an external file acquisition function 15 so as to acquire an external file on which the discrimination information S of the apparatuses made into the managed object apparatuses K according to the external file acquisition function 15. The managed object limiting part 12 reads the data of the discrimination information S of the apparatuses from the acquired external file concerned, and is capable of storing the data of the discrimination information S of the apparatuses in the memory part 4 as the discrimination information S for specifying the managed object apparatuses K. Here, the external file may be acquired from a recording medium on which the external file is recorded by connecting the recording medium to an interface of the image forming apparatus. Alternatively, data of the external file may be acquired through the communication part 5.

Moreover, the managed object limiting part 12 is provided with a function to limit the apparatuses that are set as the managed object apparatuses K after acquiring the discrimination information of the apparatuses which are communicable through the communication part 5 from the apparatuses concerned.

That is, the managed object limiting part 12 selects the apparatuses set as the managed object apparatuses K according to a managed object apparatus individually selecting operation performed on the input part 2, after acquiring the discrimination information of the apparatuses which are communicable through the communication part 5 from the apparatuses concerned. The managed object limiting part 12 stores the discrimination information S of the selected apparatuses in the memory part 4 as discrimination information S for specifying the managed object apparatuses K. The managed object apparatus individually selecting operation is an operation to make a selection by displaying a list of the discrimination information of the apparatuses on the display part 3, indicating only the discrimination information of the apparatuses made into the managed object apparatuses K by an operation of the input part 2 by reversing display, and pressing a determination button.

The managed object limiting part 12 also has a sorting function 16 to sort and display the discrimination information of the apparatuses according to items consisting of the discrimination information when causing the display part to display the discrimination information of the apparatuses. The items consisting the discrimination information include type information and manufacturer information of the apparatuses.

Therefore, when causing the display part 2 to display the discrimination information of the apparatuses, the managed object limiting part 12 can sort and display the discrimination information for each manufacturer and for each type of apparatuses.

Moreover, the managed object limiting part 12 is capable of acquiring the discrimination information of the apparatuses, which are communicable through the communication part 5, and storing the acquired discrimination information in the memory part 4. Then, the managed object limiting part 12 generates a list of kinds of elements contained in each of the items, which constitute the acquired discernment information. The managed object limiting part 12 causes the display part 3 to display the list, and receives from the input part 2 an instruction of selection of the kind in the list which is displayed by the display part 3. Then, the managed object limiting part 12 stores the discrimination information containing the selected kind in the memory part 4 as the discrimination information S of the apparatuses, which are set as the managed object apparatuses K.

FIG. 3 shows an example of the discrimination information S of the managed object apparatuses and an example of the state information. In FIG. 3, Model/Number, IP address, Media Access Control (MAC) Address, and Manufacturer Name correspond to the discrimination information S of the managed object apparatuses K, and are acquired as MIB information. In the Model/Number, a part followed by a hyphen represents a model number, and there may be a case in which two or more Model/Numbers have the same model number. The number after the hyphen is a serial number, which does not duplicate in the same model. Therefore, the Model/Number can uniquely identify each apparatus. As the state information, an abnormal communication time (abnormality generated time) and a normal communication time (return to normal time) are managed. It can be judged that the apparatus is functioning normally at present when the normal communication time is later than the abnormal communication time. A report day is a date on which a notification of predetermined state information is sent from the image forming apparatus to the center apparatus 100.

For example, when there are two each of apparatuses of manufacturers A and B, the two kinds, i.e., manufactures A and B, are displayed on the display part 3 as elements contained in the item of manufacture information. Then, when the manufacturer A is selected according to the instruction input through the input part 2, the two apparatuses of which item of manufacture information indicates the manufacture A are selected as managed object apparatuses.

FIG. 4 shows apparatus information required for connecting the image forming apparatus C to the center apparatus 100. The apparatus information is also stored in the memory part 4, and the telephone number and conditions of telephone calling of the center apparatus 100 are specified beforehand. In order to connect the image forming apparatus C to the center apparatus 100, the connection can be made through a public telephone network or through LAN and the Internet.

The managed object limiting part 12 causes the display part 3 to display discrimination information including the selected kind before storing in the memory part 4 the discrimination information of the apparatuses set as managed objects. Then, the managed object limiting part 12 receives from the input part 2 a confirmation input as to whether the apparatuses corresponding to the selected discrimination information are appropriate for the manages objects, and stores the information in the memory part 4 as the discrimination information S of the managed object apparatuses K.

As mentioned above, the manufacturer information and model information of the apparatuses concerned are included in the items, which constitute the apparatus discrimination information. When acquiring the apparatus discrimination information from the apparatuses concerned, the managed object limiting part 12 uses a Simple Network Management Protocol (SNMP), and the discernment information consists of items of Management Information Base (MIB).

FIG. 5 shows an example of information representing communication conditions of each apparatus. The information representing communication condition is also stored in the memory part 4. In the information, with respect to the apparatus corresponding to the model information 1234, it is specified that a counter value (a number of printing pages) is acquired in the form of MIB by SNMP and alarm information is acquired in the form of XML by HTTP.

The managed object specifying part 7 having the managed object limiting part 12, is activated by an operation to input part 2 or a remote activation part 17. The remote activation part 17 starts an operation of the managed object specifying part 7 when receiving a start command for the managed object specifying part 7 through the communication part 5 from external apparatuses (portable terminals CE of a customer engineer and/or customer terminals PC).

Here, the method to limit the managed object apparatuses by the managed object limiting part 12 can be selected previously from among the above-mentioned limiting methods of a plurality of managed objects through an operation to the input part 2 or a remote operation made by an external apparatus.

In the present embodiment, a request to the center apparatus 100 and reception of information from the center apparatus 100 are performed according to SOAP (Simple Object Access Protocol).

Moreover, the information providing part 11 is provided with a Web server part 18 which provides to an external apparatus the state information J for each managed object apparatus stored in the memory part 4 through the communication part 5.

Moreover, the apparatus monitoring part 9 acquires the abnormality generated time and the return to normal time as the state information J for each managed object apparatus, and stores the acquired time information in separate memory areas, respectively.

Additionally, the apparatus monitoring part 9 has an abnormality determining part 19 which determines that a managed object apparatus having a return to normal time later than an abnormality generated time is currently working in a normal state, and determines that a managed object apparatus having a return to normal time earlier than an abnormality generated time is currently working in an abnormal state. Moreover, the apparatus monitoring part 9 has a schedule functional part 21 which acquires the above-mentioned state information periodically at a preset time.

Moreover, the memory part 4 stores a first acquisition procedure for acquiring state information J from the managed object apparatuses K which should be managed through the communication part 5 and a second acquisition procedure for acquiring the state information J of the image forming apparatus as one of the managed object apparatuses. Therefore, the apparatus monitoring part 9 performs the first acquisition procedure when acquiring the state information from the managed object apparatuses K which should be managed through the communication part 5, and performs the second acquisition procedure when acquiring the state information of the image forming apparatus itself.

Upon reception of an information providing request through the communication part 5 from a portable terminal CE of a customer engineer or a customer terminal PC which is an external apparatus, the Web server part 18 reads the state information J according to the request concerned from the memory part 4, and transmits the state information J to the portable terminal CE or the customer terminal PC which made the request.

The control part 6 is provided with self review part 22 which reads the state information J from the memory part 4 according to an operation of the input part 2 and displays the state information J concerned on the display part 3. Moreover, the control part 6 is provided with a Web client part 23 which sends a review request of the state information to an external image forming apparatus via the communication part 5, and displays the state information received from the external Web server part concerned through the communication part 5 on the display part 3.

Here, in FIG. 1, the image forming part 1 comprises mechanisms and sensors necessary for performing electrophotographic printing. The input part 2 is a part which has an input means having a touch key panel or buttons. The display part 3 is constituted by a liquid crystal display panel or the like. The memory part 4 includes a random access memory (RAM), a read only memory (ROM), a hard disc drive (HDD), etc. as a memory. The communication part 5 includes a modem connectable to the center apparatus 100 through a public telephone network and a protocol interface which communicates with managed object apparatuses through LAN. The control part 6 comprises a central processing unit (CPU) and an application specification integrated circuit (ASIC). The control part 6 can carry out parallel processing of the processes for realizing the function of each part contained in the control part 6 on the multitask general-purpose operating system.

A description will now be given of an operation of the image forming apparatus C according to the present embodiment.

First, the managed object specifying part 7 is activated by operating the input part 2, the portable terminal CE or the customer terminal PC. When the managed object specifying part 7 is activated, the managed object limiting part 12 is activated so as to store the identification information S in the memory part 4 in accordance with a previously selected limiting method of the managed object apparatuses K.

Then, the apparatus correspondence condition acquiring part 8 is activated so as to send the discrimination information of the managed object apparatuses stored in the memory part 4 to the center apparatus 100 through the communication part 5.

Upon reception of the discrimination information S regarding the managed object apparatuses, the center apparatus 100 searches for a communication condition for each apparatus corresponding to the discrimination information concerned, and sends the information regarding the communication condition to the image forming apparatus C.

Upon reception of the information regarding communication condition from the center apparatus 100, the apparatus correspondence communication condition acquiring part 8 relates the communication condition J concerned to the discrimination information S of the corresponding managed object apparatuses, and stores the information in the memory part 4.

Then, the apparatus monitoring part 9 is activated so as to acquire the state information of each managed object apparatus K and the image forming apparatus itself and store the state information in the memory part 4.

Figure 6:
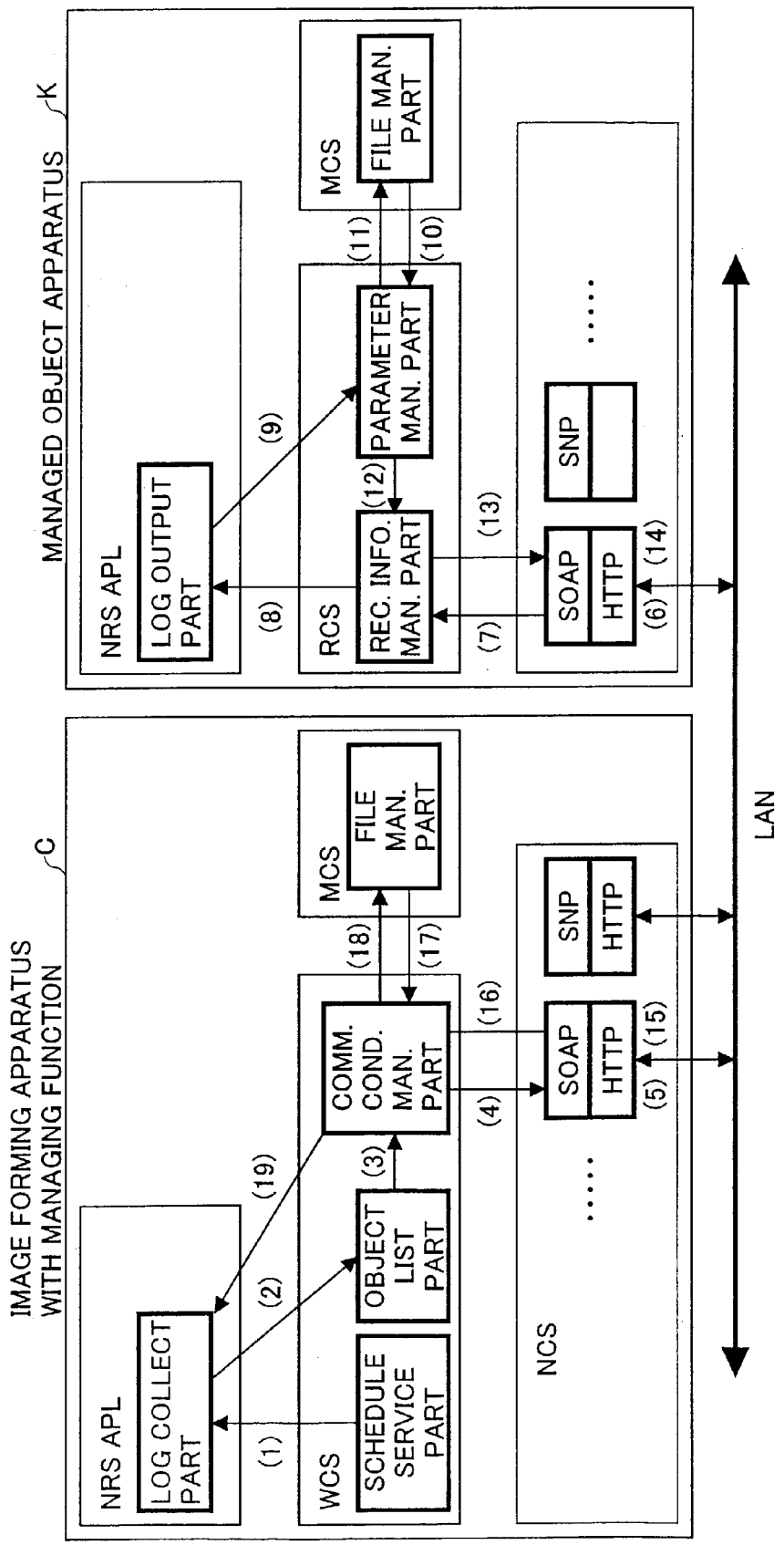
FIG. 6 is an illustration showing a procedure carried out by the image forming apparatus to collect logs from one of the managed object apparatuses.

FIG. 6 shows a procedure carried out by the image forming apparatus C to collect logs from one of the managed object apparatuses K. It should be noted that arrows in the figure indicate a flow of commands, requests and data, and numbers represents sequence thereof. When NRS starts log collection according to schedule service of RCS, the managed object apparatus K from which logs should be collected is specified in RCS, and communication conditions corresponding to the apparatuses are identified and a request is sent to the managed object apparatus K in accordance with SOAP. The managed object apparatus K receives the request according to SOAP, and RCS sends to MRS a request of outputting the logs. NRS of the managed object apparatus K sends a command through MCS to read the logs and transfer the logs to RCS. The read log is sent to the image forming apparatus C by NCS. Upon reception of the logs by NCS, the image forming apparatus C causes MCS to store the logs in the memory part 4 as state information of the managed object apparatus concerned.

Then, when a review request of the state information J is sent to the information providing part 11 and the request made through the input part 2, the self review part 22 is operated and the requested state information is displayed on the display part 3. On the other hand, when the review request is made by the portable terminal CE or the customer terminal PC, the Web server part 18 is operated and the state information J stored in the memory part 4 is transmitted to the portable terminal CE or the customer terminal PC which made the request.

Moreover, when it is desirable to receive information provided by an external Web server, the Web client part 23 is activated so as to review the information provided by the external Web server part by displaying the information on the display part 3.

Figure 7:
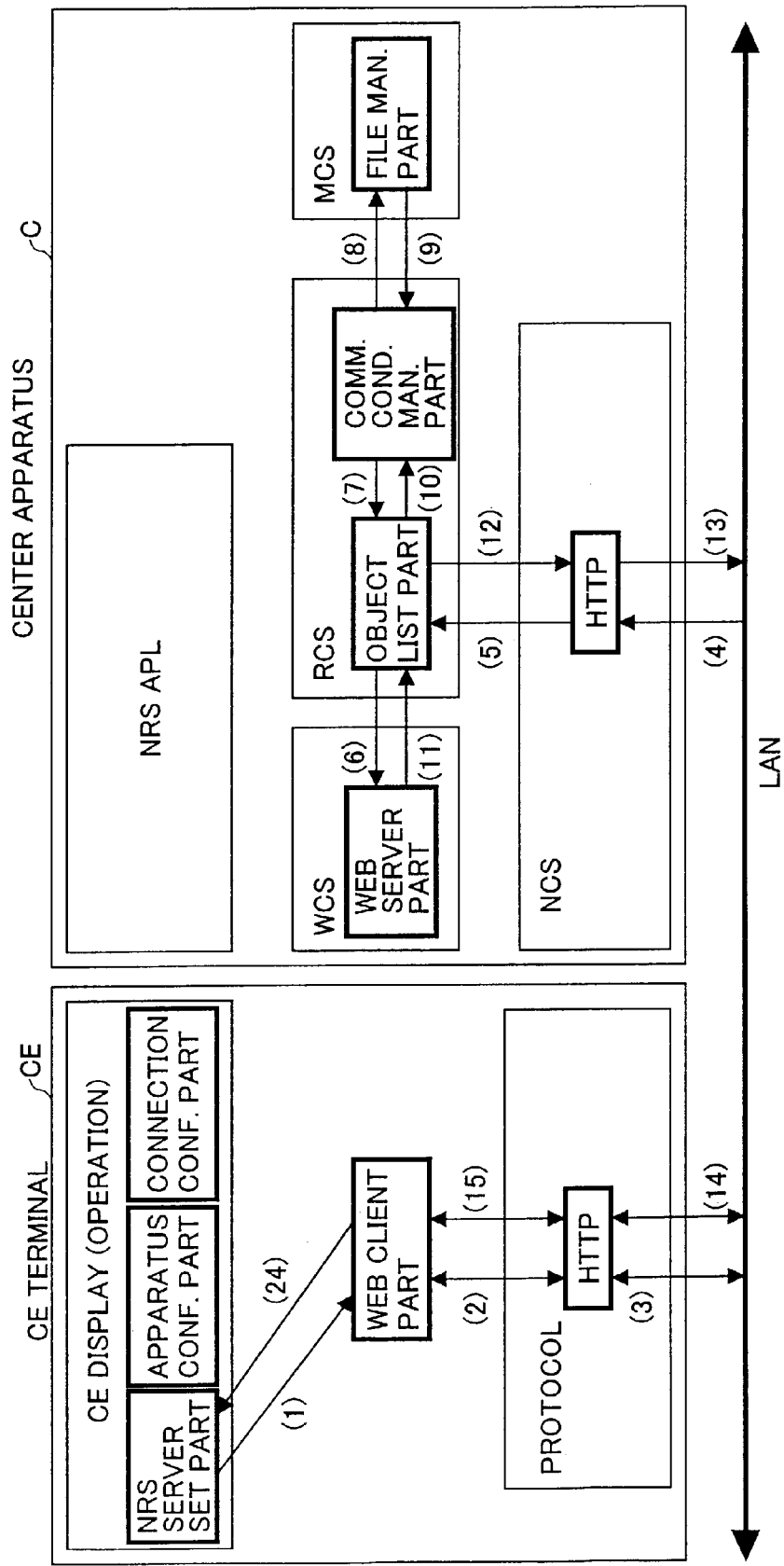
FIG. 7 is an illustration showing a procedure for reviewing state information managed by the image forming apparatus through a portable terminal.

FIG. 7 shows a procedure for reviewing through a portable terminal CE state information managed by the image forming apparatus C. It should be noted that, in the figure, arrows indicate a flow of commands, requests and data, and numbers attached to the arrows represents their sequence. When a request is made through HTTP according to a Web client function of the portable terminal, the state information read by MCS is transferred to WCS in the image formation apparatus C, and, then, the state information is sent to the portable terminal CE according to HTTP. Thus, the state information can be reviewed through the Web client part of the portable terminal.

Figure 8:
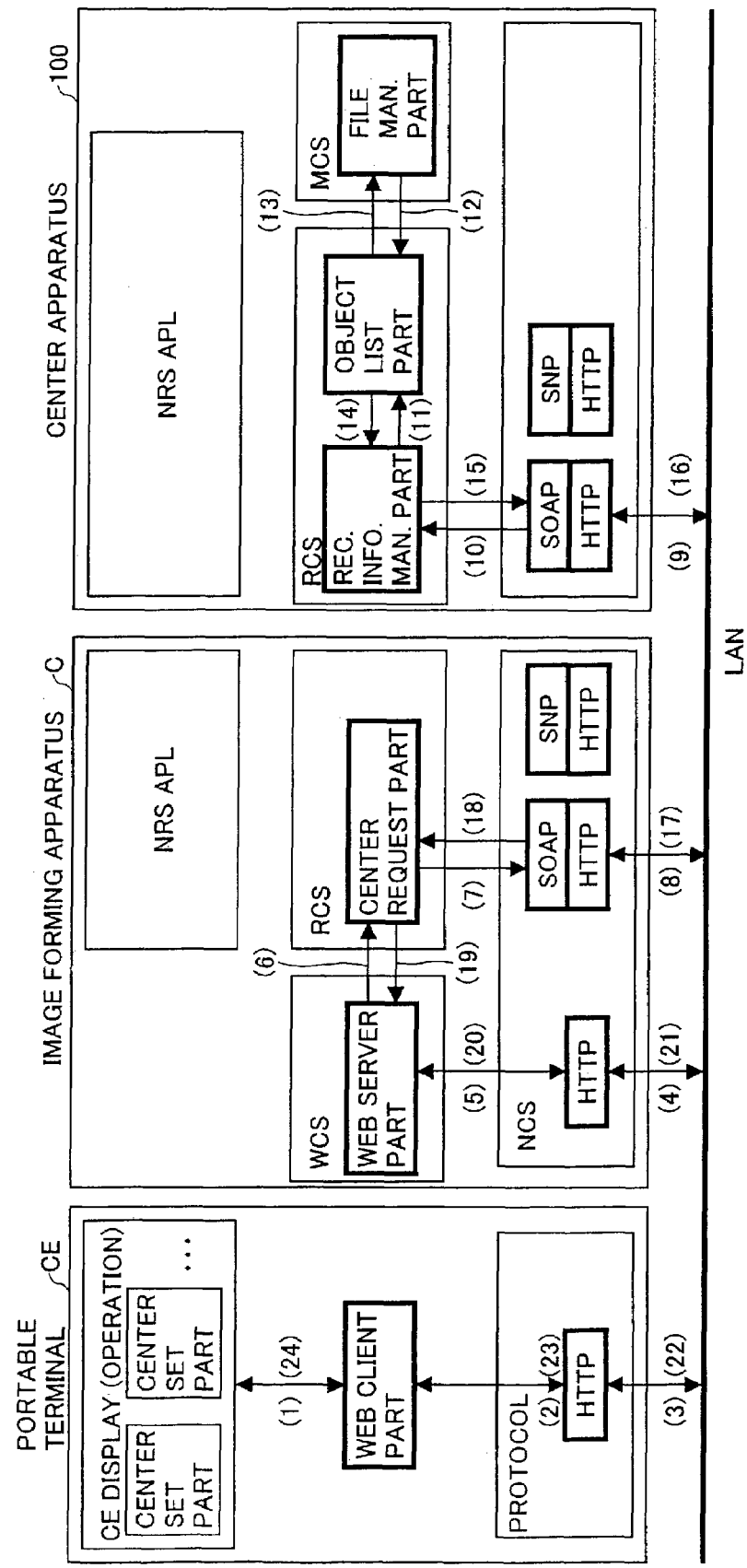
FIG. 8 is an illustration showing a procedure for reviewing information held by the center apparatus through the portable terminal.

FIG. 8 shows a procedure for reviewing information held by the center apparatus through the portable terminal CE. In this case, a request (HTTP) from the portable terminal CE is processed by the image forming apparatus C, and, then, the information providing request (SOAP) is sent from the image forming apparatus C to the center apparatus 100. The information provided from the center apparatus 100 to the image forming apparatus C according to SOAP is transferred from the image forming apparatus C to the portable terminal CE according to HTTP. The thus-provided image can be reviewed through the Web client function of the portable terminal CE.

Figure 9:
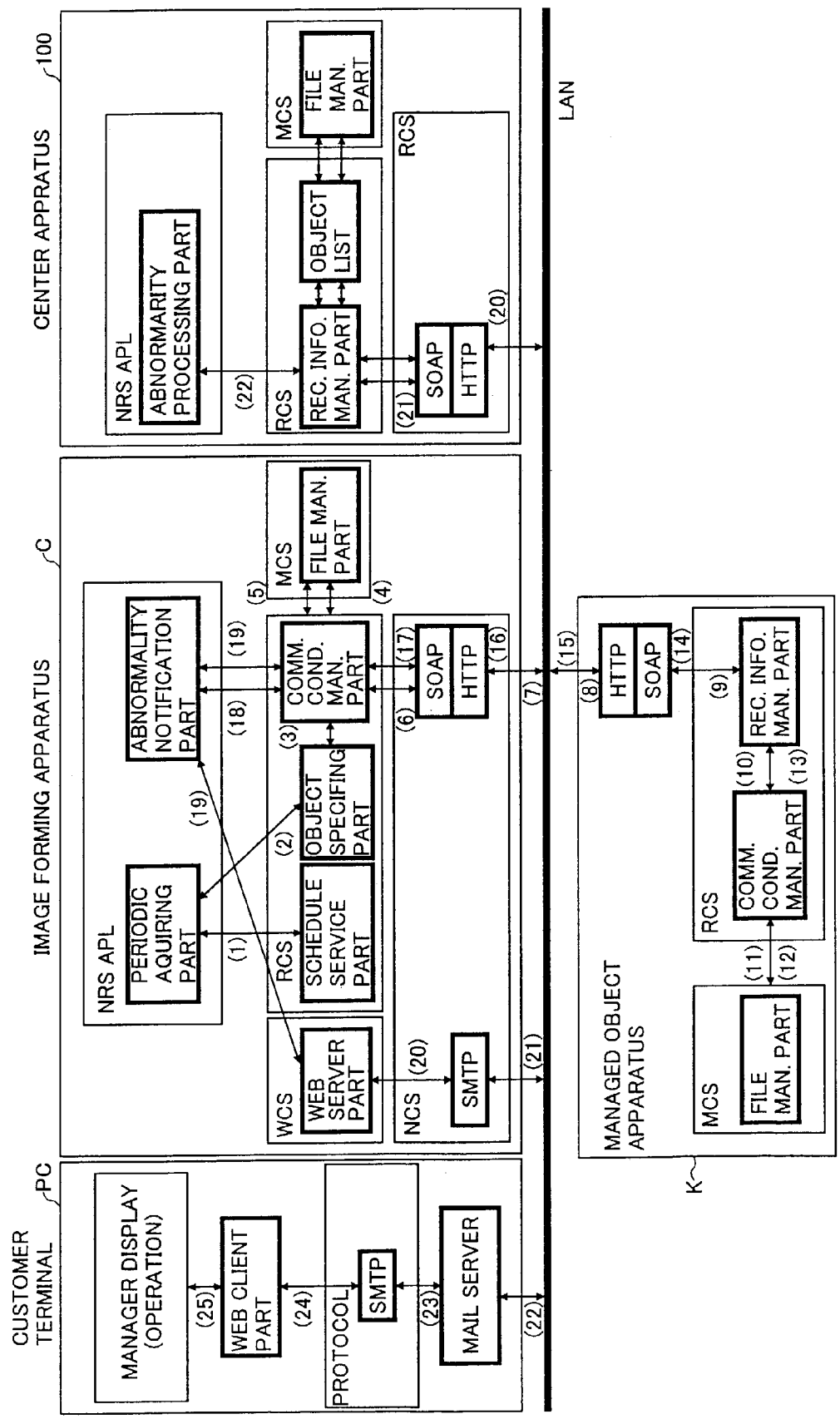
FIG. 9 is an illustration showing a procedure of sending a notification of an abnormality generated in the managed object apparatus to the customer terminal and the center apparatus.

FIG. 9 shows a procedure of sending a notification of an abnormality generated in the managed object apparatus K to the customer terminal PC and the center apparatus 100. The state information of the managed object apparatus K is periodically acquired by schedule service of RCS according to SOAP, and is accumulated in the memory part 4 of the image formation apparatus C by MCS. If abnormality of the managed object apparatus K is detected based on the state information, an abnormality notification function is activated so as to send an abnormality notification to the center apparatus 100 according to SOAP, and an electronic mail is sent to the customer terminal PC according to SMTP. In the center apparatus 100, a predetermined abnormality processing is performed based on the received abnormality notification. In the customer terminal PC, an electronic mail which notifies occurrence of the abnormality can be reviewed through an interface such as the Web client function.

FIG. 10 is an example of a screen for reviewing the state information by the portable terminal CE or the customer terminal PC. In the example shown in FIG. 10, the state information is displayed with a model and a serial number to which an installation place of the apparatus, date and time of occurrence of the abnormality and a contact number of a person in charge are related.

FIGS. 11A and 11B show examples of a procedure for reviewing the state information. If the discrimination information of the managed object apparatuses is elected as shown in FIGS. 11A and 11B, CGI of a Web page may be prepared so that the list of abnormal logs of the selected apparatus is displayed.

According to the present embodiment explained above, the setting of the managed object apparatuses K to the image forming apparatus C can be easily performed according to the function of the managed object specifying part 7. Moreover, since the apparatus correspondence communication condition acquiring part 8 prepares an appropriate communication condition for each managed object apparatus, the state information can be properly acquired from various managed object apparatuses K. Moreover, according to the function of the information providing part 11, the state information can be reviewed on the display part 3 of the image forming apparatus C or through the external terminals CE and PC, and, thereby, the state information of a plurality of apparatuses can be checked without moving. Moreover, a communication line between the image forming apparatus C and the center apparatus 100 is always maintained due to the managing function of the managed object apparatuses being incorporated into the image forming apparatus C, and there is a small risk of unexpected accident. Thus, a stable management can be achieved.

The present invention is not limited to the specifically disclosed embodiments, and variations and modifications may be made without departing from the scope of the present invention.

The present application is based on Japanese priority applications No. 2002-118849 filed Apr. 22, 2002 and No. 2003-109350 filed Apr. 14, 2003, the entire contents of which are hereby incorporated by reference.

What is claimed is:

1. An image forming apparatus comprising:
   a memory device;
   an image forming device;
   an input device which directs operations to the image forming device;
   a communication part configured to communicate with external apparatuses;
   a managed object specifying part configured to specify managed object apparatuses that are managed by the image forming apparatus through the communication part;
   an apparatus correspondence communication condition acquiring part configured to receive via said communication part information regarding communication conditions corresponding to the managed object apparatuses which the managed object specifying part specified, and configured to store in the memory device the received information regarding communication conditions by relating to identification information of the managed object apparatuses;
   an apparatus monitoring part configured to refer to the communication conditions stored in said memory device on an individual managed object apparatus basis so as to acquire state information via said communication part on an individual managed object apparatus basis, and configured to store the acquired state information in said memory device; and
   an information providing part configured to provide to external apparatuses through the communication part the state information of each managed object apparatus stored in said memory device; and
   wherein the managed object specifying part is arranged to specify information regarding communication conditions corresponding to the managed object apparatuses which includes information regarding a protocol used for acquiring the state information from the managed object apparatuses or information regarding a data format of the state information to be acquired.

2. The image forming apparatus as claimed in claim 1, wherein said managed object specifying part comprises a managed object limiting part which selects said managed object apparatuses from among apparatuses communicable through said communication part.

3. The image forming apparatus as claimed in claim 2, wherein said managed object specifying part selects the managed object apparatuses prior to acquiring discrimination information from the external apparatuses communicable through said communication part.

4. The image forming apparatus as claimed in claim 3, further comprising a scanner device which scans character images on a medium and a character recognition device which converts the character image read by the scanner device into character data, wherein said managed object limiting part acquires data of the discrimination information, which corresponds to apparatuses to be set as said managed object apparatuses, recorded on the medium by said scanner device and said character recognition device, and stores the data of the discrimination information in said memory device as information for specifying said managed object apparatuses.

5. The image forming apparatus as claimed in claim 3, wherein said managed object limiting part has an external file acquiring function to acquire an external file in which the discrimination information of apparatuses to be set as said managed object apparatuses is stored, and said managed object limiting part reads the data of the discrimination information from the external file and stores the data of the discrimination information in said memory device as information for specifying said managed object apparatuses.

6. The image forming apparatus as claimed in claim 2, wherein said managed object limiting part selects apparatuses to be set as said managed object apparatuses after acquiring the discrimination information from the apparatuses communicable through said communication part.

7. The image forming apparatus as claimed in claim 6, wherein said managed object limiting apparatus selects the apparatuses to be set as said managed object apparatuses in accordance with managed object apparatus individually selecting operation applied from said input device after acquiring the discrimination information from the apparatuses communicable through said communication part, and stores the data of the discrimination information in said memory device as information for specifying said managed object apparatuses.

8. The image forming apparatus as claimed in claim 6, wherein said managed object limiting apparatus causes a display part to display the discrimination information of the apparatuses communicable through said communication part after acquiring the discrimination information from the apparatuses communicable through said communication part, and, thereafter, selects the apparatuses to be set as said managed object apparatuses in accordance with managed object apparatus individually selecting operation applied from said input device and stores the data of the discrimination information in said memory device as information for specifying said managed object apparatuses.

9. The image forming apparatus as claimed in claim 6, wherein said managed object limiting part acquires the discrimination information from the apparatuses communicable through said communication part and stores the acquired discrimination information in said memory device, said managed object limiting part generating a list of kinds of elements contained in the acquired discrimination information on an individual item basis and displaying the list on a display part, and upon receipt of selection from said input device of kinds in the list displayed on said display part, said managed object limiting part stores the discrimination information containing the selected kinds in said memory device as the apparatus to be set as said managed object apparatuses.

10. The image forming apparatus as claimed in claim 9, wherein said managed object limiting part displays the discrimination information containing the selected kinds on said display part before storing the discrimination information in said memory device as the discrimination information of the apparatus to be set as said managed object apparatuses, and receives from said input device a confirmation input as to whether or not the apparatuses corresponding to the displayed discrimination information are appropriate for said managed object apparatuses.

11. The image forming apparatus as claimed in claim 9, wherein the discrimination information of the apparatuses includes information regarding manufacturer names of the apparatuses.

12. The image forming apparatus as claimed in claim 9, wherein the discrimination information of the apparatuses includes information regarding models of the apparatuses.

13. The image forming apparatus as claimed in claim 6, wherein said managed object limiting part uses Simple Network Management Protocol (SNMP) when acquiring the discrimination information from the apparatuses, and the discrimination information is constituted by items of Management Information Base (MIB).

14. The image forming apparatus as claimed in claim 3, wherein said managed object limiting part uses Simple Network Management Protocol (SNMP) when acquiring the discrimination information from the apparatuses, and the discrimination information is constituted by items of Management Information Base (MIB).

15. The image forming apparatus as claimed in claim 1, further comprising a remote start device for starting an operation of said managed object specifying part when receiving a start command of said managed object specifying part from said external apparatuses through said communication part.

16. The image forming apparatuses as claimed in claim 1, wherein a request to a center apparatus which manages said image forming apparatus and reception from the center apparatus are performed according to Simple Object Access Protocol (SOAP).

17. A method of operating an image forming apparatus comprising:
communicating with external apparatuses through a communication part;
specifying, through the communication part, managed object apparatuses that are managed by the image forming apparatus using a managed object specifying part;
receiving information regarding communication conditions corresponding to the specified managed object apparatuses through an apparatus correspondence communication condition acquiring part;
storing the received communication condition information in a memory device by relating to identification information of the managed object apparatuses;
monitoring managed object apparatuses with an apparatus monitoring part by referring to the communication conditions stored in said memory device on an individual managed object apparatus basis;
acquiring state information via said communication part on an individual managed object apparatus basis;
storing the acquired state information in said memory device; and
providing the state information of each managed object apparatus stored in said memory device to external apparatuses through the communication part; and
wherein the managed object specifying part specifies information regarding communication conditions corresponding to the managed object apparatuses which includes information regarding a protocol used for acquiring the state information from the managed object apparatuses or information regarding a data format of the state information to be acquired.

18. An image forming apparatus comprising:
an image forming device;
an input device which directs operations to the image forming device;
a display part which performs a display according to operations of the input device;
a memory device which stores image data required for the operation of the image forming device;
a communication part which communicates with external apparatuses;
a control part which controls said image forming device, said input device, said display part, said memory device, said communication part and a communication part;
a managed object specifying part which specifies managed object apparatuses that are managed by the image forming apparatus through the communication part;
an apparatus correspondence communication condition acquiring part which receives via said communication part information regarding communication conditions corresponding to the managed object apparatuses which the managed object specifying part specified, and stores in the memory device the received information regarding communication conditions by relating to identification information of the managed object apparatuses;
an apparatus monitoring part which refers to the communication conditions stored in said memory device on an individual managed object apparatus basis so as to acquire state information via said communication part on an individual managed object apparatus basis, and stores the acquired state information in said memory device; and
an information providing part which provides to external apparatuses through the communication part the state information of each managed object apparatus stored in said memory device,
wherein the managed object specifying part is arranged to specify information regarding the communication conditions corresponding to the managed object apparatuses which include information regarding a protocol used for acquiring the state information from the managed object apparatuses or information regarding a data format of the state information to be acquired;
the apparatus monitoring part is adapted to refer to the communication conditions stored in said memory device on an individual managed object apparatus basis to control the communication part to communicate with a respective one of the managed object apparatuses; and
the apparatus correspondence communication condition acquiring part is arranged to receive the communication condition for performing communication with the respective one of the managed object apparatuses from a center apparatus through the communication part.

* * * * *